United States Patent [19]
Nishioka et al.

[11] Patent Number: 4,721,692
[45] Date of Patent: Jan. 26, 1988

[54] DIELECTRIC CERAMIC COMPOSITION
[75] Inventors: Goro Nishioka, Ibaraki; Yukio Sakabe, Kyoto, both of Japan
[73] Assignee: Murata Manufacturing Co., Ltd., Japan
[21] Appl. No.: 52,542
[22] Filed: May 20, 1987
[30] Foreign Application Priority Data
May 27, 1986 [JP] Japan ................. 61-121965
[51] Int. Cl.$^4$ ............ C04B 35/46; C04B 35/10
[52] U.S. Cl. ................... 501/134; 501/135; 501/136; 501/153
[58] Field of Search ............. 501/134, 135, 136, 153
[56] References Cited
U.S. PATENT DOCUMENTS
4,614,725 9/1986 Ando et al. ................ 501/153
FOREIGN PATENT DOCUMENTS
0169077 1/1986 European Pat. Off. ........ 501/136
59-045967 3/1984 Japan ................. 501/134
61-077208 4/1986 Japan ................. 501/136
0543642 1/1977 U.S.S.R. ............. 501/134

Primary Examiner—William R. Dixon, Jr.
Assistant Examiner—Anthony Green
Attorney, Agent, or Firm—Ostrolenk, Faber, Gerb & Soffen

[57] ABSTRACT

A dielectric ceramic composition consists essentially of $Al_2O_3$ and additives composed of $TiO_2$, $MnO_2$ and at least one member selected from the group consisting of $BaZrO_3$, $CaTiO_3$ and $SrTiO_3$, the contents of the additives per 100 parts by weight of $Al_2O_3$ being 0.5 to 10.0 parts by weight for $TiO_2$, 0.5 to 6.0 parts by weight for $MnO_2$ and not more than 20 parts by weight for at least one member selected from the group consisting for $BaZrO_3$, $CaTiO_3$ and $SrTiO_3$. The dielectric ceramic composition may further contain at least one oxide selected from the group consisting of $Co_2O_3$, $Fe_2O_3$, NiO, $Cr_2O_3$ and CuO in an amount of not more than 5 parts by weight per 100 parts by weight of $Al_2O_3$.

2 Claims, No Drawings

DIELECTRIC CERAMIC COMPOSITION

BACKGROUND OF THE INVENTION
1. Field of the Invention

This invention relates to a dielectric ceramic composition and, more particularly, an improved dielectric ceramic composition useful as a dielectric material for monolithic ceramic capacitors and the like.

2. Description of the Prior Art

As a dielectric ceramic composition for monolithic ceramic capacitors, there have widely been used those comprising, as a main constituent, barium titanate ($BaTiO_3$) or titanium dioxide ($TiO_2$). In the sequence of manufacture, monolithic ceramic capacitors are occasionally trimmed by laser beams to adjust its capacitance so that the dielectric ceramic compositions therefor are required to have such a property that they are scarcely affected by application of laser beam. However, the above ceramic compositions have such a disadvantage that the insulation resistance thereof is considerably decreased by the application of laser beams, thus making it difficult to manufacturing monolithic ceramic capacitors with desired characteristics.

In order to solve this problem, it is considered to be preferred to use alumina ceramics since the insulation resistance thereof is never decreased even by the application of laser beam. However, the alumina ceramics have a high sintering temperature of not less than 1600° C., thus making it impossible to manufacture monolithic ceramic capacitors even if noble metals such as Pd and Pt, which have a high melting point, are used as a material for internal electrodes.

SUMMARY OF THE INVENTION

It is therefore an object of the present invention to provide a dielectric ceramic composition with a sintering temperature lower than that of alumina ceramics and having a high insulation resistance which is scarcely lowered by the application of laser beam.

According to the present invention the above object is achieved by providing a dielectric ceramic composition consisting essentially of alumina ($Al_2O_3$) and additives composed of $TiO_2$, $MnO_2$ and at least one member selected from the group consisting of $BaZrO_3$, $CaTiO_3$ and $SrTiO_3$, the contents of said additives per 100 parts by weight of $Al_2O_3$ being 0.5 to 10.0 parts by weight for $TiO_2$, 0.5 to 6.0 parts by weight for $MnO_2$ and not more than 20 parts by weight for at least one member selected from the group consisting of $BaZrO_3$, $CaTiO_3$ and $SrTiO_3$.

In one preferred embodiment, the dielectric ceramic composition of the present invention may further contain at least one oxide selected from the group consisting of $Co_2O_3$, $Fe_2O_3$, $NiO$, $Cr_2O_3$ and $CuO$ in an amount of not more than 5 parts by weight per 100 parts by weight of $Al_2O_3$.

DETAILED DESCRIPTION OF THE INVENTION

The dielectric ceramic composition of the present invention may be prepared in the well known manner, for example, by a process comprising the steps of weighing and wet mixing fine particles of raw materials, forming the resultant mixture, firing the shaped body in air at a temperature of not more than 1360° C. As raw materials there may be used those such as oxides, carbonates and other compounds of the above elements which finally provide the corresponding oxides in the composition. Also, the raw materials may be used in the form of titanates such as $CaTiO_3$, $SrTiO_3$, or zirconates such as $BaZrO_3$ and the like.

In the dielectric ceramic composition of the present invention, the added amounts of the additives per 100 parts by weight of $Al_2O_3$ have been limited to those falling within the above respective ranges for the following reasons: If the added amount of $TiO_2$ is less than 0.5 parts by weight, the sintering temperature rises to a temperature higher than 1400° C. If the added amount of $TiO_2$ exceeds 10.0 parts by weight, the Q value decreases to less than 2000 and the insulation resistance is decreased to less than $10^{11}\Omega$ by application of laser beam. Thus, the added amount of $TiO_2$ has been limited to a value ranging from 0.5 to 10.0 parts by weight per 100 parts by weight of $Al_2O_3$.

If the added amount of $MnO_2$ is less than 0.5 parts by weight, the sintering temperature rises to higher than 1400° C. and the Q value decreases to less than 2000. If the added amount of $MnO_2$ exceeds 6.0 parts by weight, the Q value decreases to less than 2000 and the insulation resistance lowers to less than $10^{11}\Omega$ by application of laser beam. For these reasons, the added amount of $TiO_2$ per 100 parts by weight of $Al_2O_3$ has been limited to a value ranging from 0.5 to 6.0 parts by weight.

The addition of at least one member selected from the group consisting of $BaZrO_3$, $CaTiO_3$ and $SrTiO_2$ contributes to control the temperature coefficient of capacitance. However, if the added amount of these constituents exceeds 20 parts by weight, the sintering temperature rises to more than 1400° C. and the insulation resistance decreases to less than $10^{11}\Omega$ by application of laser beam. Thus, the added amount of at least one member of $BaZrO_3$, $CaTiO_3$ and $SrTiO_2$ has been limited to a value not more than 20.0 parts by weight per 100 parts by weight of $Al_2O_3$. Preferably, the added amount of the above at least one member is 1.0 part by weight.

The addition of at least one oxide selected from the group consisting of $Co_2O_3$, $Fe_2O_3$, $NiO$, $Cr_2O_3$ and $CuO$ makes it possible to lower the sintering temperature without causing lowering of the Q value and insulation resistance. However, if the addition of these oxides exceeds 5 parts by weight, the Q value considerably decreases and the insulation resistance decreases to less than $10^{11}\Omega$ by the application of laser beam. Thus, the added amount of at least one of the above oxides has been limited to a value not more than 5.0 parts by weight per 100 parts by weight of $Al_2O_3$.

The dielectric ceramic composition according to the present invention can be sintered at a temperature not more than 1360° C. and has a high insulation resistance which is scarcely decreased by application of laser beam. Thus, the present invention makes it possible to manufacture monolithic ceramic capacitors with desired characteristics since capacitor chips can be trimmed by laser beams without lowering of insulation resistance. Also, the the present invention makes it possible to use inexpensive metals such as nickel as internal electrodes for monolithic ceramic capacitors instead of expensive noble metals such as Pd and Pt since the composition has a low sintering temperature.

The above and other objects, features and advantages of the present invention will be further apparent from the following description with reference to the examples and comparative examples.

EXAMPLES

As raw materials there were used $Al_2O_3$, $TiO_2$, $MnCO_3$, $Fe_2O_3$, $CoCO_3$, NiO, $Cr_2O_3$, CuO, $BaCO_3$, $ZrO_2$, $SrCO_3$ and $CaCO_3$. The raw materials were weighed to prepare a mixture for preparation of a dielectric ceramics composition shown in Table 1. The mixture was wet mixed in a ball mill for 16 hours, dewatered, and then calcined at 1000° to 1200° C. for 2 hours. The clinker was crushed, ground and then milled together with a binder, 6 to 15 wt % of polyvinyl alcohol, for 16 hours. The resultant powder was dry pressed under 2000 $Kg/cm^2$ into disks with a diameter of 30 mm and a thickness of 0.8 mm and then fired at 1240° to 1550° C. The resultant ceramic disks were applied with silver paste and then baked at 800° C. to form silver electrodes on opposite sides of the ceramic discs.

For each specimen thus prepared, the measurements were made on sintering temperature, dielectric constant (K), Q, insulation resistance after application of laser beam, temperature coefficient of capacitance under the following conditions. Results are shown in Table 2.

The dielectric constant and Q were measured at 1 MHz, 25° C. with a LCR bridge meter, Model 4192, made by Yokogawa Hewlett Packard CO.

For measurement of insulation resistance after application of laser beam, the above ceramic disc was provided on its one side with a silver electrode and this electrode divided in equal parts with a YAG laser (output 4 w). The resistance between two parts of the electrode was measured as the insulation resistance by applying a DC voltage of 200 V.

The temperature coefficient of capacitance was determined from values of capacitance a 25° C. and 85° C. by $\{(C_{85}-C_{25})/C_{25}(85-25)\}\times 10^6$ (ppm/°C.) where $C_{85}$ is a capacitance at 85° C. and $C_{25}$ is a capacitance constant at 25° C.

COMPARATIVE EXAMPLE

Using $TiO_2$, BaO and $Nd_2O_3$ as raw materials, there was prepared a comparative specimen having a composition 54.5 mol % $TiO_2$ —7.5 mol % BaO—38 mol % $NdO_3/2$ in the same manner as in Example. Physical and electrical properties were measured in the same manner as the above. Results are also shown in Table 2.

TABLE 1

| | Added amount of additives per 100 parts by weight of $Al_2O_3$ (parts by weight) | | | | | | |
|---|---|---|---|---|---|---|---|
| No. | $TiO_2$ | $MnO_2$ | $BaZrO_3$ | $CaTiO_3$ | $SrTiO_3$ | Other | additive |
| 1* | 0 | 3.0 | 1.0 | 0 | 0 | — | 0 |
| 2 | 0.5 | 2.0 | 1.0 | 2.0 | 0 | — | 0 |
| 3 | 1.0 | 3.0 | 2.0 | 0 | 0 | — | 0 |
| 4 | 5.0 | 0.5 | 0 | 3.0 | 0 | — | 0 |
| 5* | 1.0 | 0 | 0 | 1.0 | 0 | — | 0 |
| 6 | 10.0 | 2.0 | 0 | 0 | 4.0 | — | 0 |
| 7* | 11.0 | 1.0 | 0 | 2.0 | 0 | — | 0 |
| 8 | 5.0 | 6.0 | 0 | 3.0 | 0 | — | 0 |
| 9* | 7.0 | 8.0 | 0 | 1.0 | 0 | — | 0 |
| 10* | 3.0 | 2.0 | 0 | 0 | 0 | — | 0 |
| 11 | 3.0 | 2.0 | 20.0 | 0 | 0 | — | 0 |
| 12* | 1.0 | 1.0 | 10.0 | 10.0 | 5.0 | — | 0 |
| 13 | 3.0 | 2.0 | 1.0 | 0 | 0 | $Co_2O_3$ | 1.0 |
| 14 | 3.0 | 2.0 | 0 | 2.0 | 1.0 | $Fe_2O_3$ | 1.0 |
| 15 | 3.0 | 2.0 | 0 | 2.0 | 0 | NiO | 1.0 |
| 16 | 3.0 | 2.0 | 0 | 2.0 | 3.0 | CuO | 1.0 |
| 17 | 3.0 | 2.0 | 0 | 2.0 | 0 | $Cr_2O_3$ | 1.0 |
| 18 | 3.0 | 2.0 | 0 | 2.0 | 1.0 | $Co_2O_3$ $Fe_2O_3$ | 1.0 1.0 |
| 19 | 3.0 | 2.0 | 0 | 2.0 | 1.0 | NiO CuO | 1.0 1.0 |
| 20 | 3.0 | 2.0 | 0 | 2.0 | 0 | CuO $Fe_2O_3$ | 2.0 3.0 |
| 21 | 3.0 | 2.0 | 0 | 2.0 | 0 | $Fe_2O_3$ | 5.0 |
| 22* | 7.0 | 5.0 | 0 | 2.0 | 0 | NiO $Fe_2O_3$ | 3.0 3.0 |
| 23* | 7.0 | 5.0 | 0 | 2.0 | 0 | CuO | 6.0 |
| 24* | Comparative example ($TiO_2$ ceramics) | | | | | | |

TABLE 2

| No. | Sintering temp.(°C.) | K | Q | Insulation resistance (Ω) | Temperature coefficient (ppm/°C.) |
|---|---|---|---|---|---|
| 1* | 1550 | 10 | >2000 | >$10^{12}$ | +95 |
| 2 | 1360 | 12 | >2000 | >$10^{12}$ | +70 |
| 3 | 1360 | 11 | >2000 | >$10^{12}$ | +85 |
| 4 | 1360 | 12 | >2000 | >$10^{12}$ | +70 |
| 5* | 1450 | 10 | 1100 | >$10^{12}$ | +90 |
| 6 | 1330 | 13 | 2100 | $3\times10^{11}$ | +80 |
| 7* | 1330 | 11 | 1200 | $5\times10^7$ | +75 |
| 8 | 1330 | 12 | >2000 | $7\times10^{11}$ | +70 |
| 9* | 1330 | 10 | 1500 | $4\times10^7$ | +90 |
| 10* | 1330 | 10 | >2000 | >$10^{12}$ | +100 |
| 11 | 1360 | 18 | >2000 | >$10^{12}$ | +40 |
| 12* | 1450 | 19 | >2000 | $6\times10^6$ | +30 |
| 13 | 1330 | 10 | >2000 | >$10^{12}$ | +95 |
| 14 | 1330 | 12 | >2000 | >$10^{12}$ | +70 |
| 15 | 1330 | 11 | >2000 | >$10^{12}$ | +75 |
| 16 | 1300 | 13 | >2000 | >$10^{12}$ | +60 |
| 17 | 1330 | 11 | >2000 | >$10^{12}$ | +75 |
| 18 | 1300 | 12 | >2000 | >$10^{12}$ | +70 |
| 19 | 1300 | 12 | >2000 | >$10^{12}$ | +70 |
| 20 | 1270 | 11 | >2000 | >$10^{12}$ | +75 |
| 21 | 1270 | 11 | >2000 | >$10^{12}$ | +75 |
| 22* | 1270 | 11 | 1000 | $4\times10^7$ | +75 |
| 23* | 1240 | 11 | >900 | $7\times10^7$ | +75 |
| 24 | 1360 | 60 | >2000 | ~$10^6$ | NPO |

In Tables 1 and 2, specimens with an asterisk (*) are those having a composition beyond the scope of the present invention, while other specimens are those having a composition included in the scope of the present invention.

As will be understood from the data shown in Tables 1 and 2, the dielectric ceramic composition of the present invention has a sintering temperature of not more than 1360° C., a high Q value of not less than 2000, and a high insulation resistance of not less than $10_{11}Ω$.

What I claim is:

1. A dielectric ceramic composition consisting essentially of $Al_2O_3$ and additives composed of $TiO_2$, $MnO_2$ and at least one member selected from the group consisting of $BaZrO_3$, $CaTiO_3$ and $SrTiO_3$, the contents of said additives per 100 parts by weight of $Al_2O_3$ being 0.5 to 10.0 parts by weight for $TiO_2$, 0.5 to 6.0 parts by weight for $MnO_2$ and not more than 20 parts by weight for said at least one member selected from the group consisting of $BaZrO_3$, $CaTiO_3$ and $SrTiO_3$.

2. The dielectric ceramic composition according to claim 1 further containing at least one oxide selected from the group consisting of $Co_2O_3$, $Fe_2O_3$, NiO, $Cr_2O_3$ and CuO in an amount of not more than 5 parts by weight per 100 parts by weight of $Al_2O_3$.

* * * * *